United States Patent
Li et al.

(10) Patent No.: US 9,489,760 B2
(45) Date of Patent: Nov. 8, 2016

(54) MECHANISM FOR FACILITATING DYNAMIC SIMULATION OF AVATARS CORRESPONDING TO CHANGING USER PERFORMANCES AS DETECTED AT COMPUTING DEVICES

(71) Applicant: INTEL CORPORATION, Santa Clara, CA (US)

(72) Inventors: Wenlong Li, Beijing (CN); Xiaofeng Tong, Beijing (CN); Yangzhou Du, Beijing (CN); Thomas Sachson, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 14/358,394

(22) PCT Filed: Nov. 14, 2013

(86) PCT No.: PCT/CN2013/087127
§ 371 (c)(1),
(2) Date: May 15, 2014

(87) PCT Pub. No.: WO2015/070416
PCT Pub. Date: May 21, 2015

(65) Prior Publication Data
US 2015/0325029 A1    Nov. 12, 2015

(51) Int. Cl.
*G06K 9/00* (2006.01)
*G06T 13/40* (2011.01)
(Continued)

(52) U.S. Cl.
CPC .............. *G06T 13/40* (2013.01); *G06F 3/012* (2013.01); *G06F 3/017* (2013.01);
(Continued)

(58) Field of Classification Search
CPC ................. G06T 13/40; G06T 7/0022; G06T 2207/30196; G06T 1/0007; G06T 3/40; G06T 2207/10016; G06T 7/20; G06K 9/00342
See application file for complete search history.

(56) References Cited

U.S. PATENT DOCUMENTS

2009/0128579 A1* 5/2009 Xie ...................... G02C 13/005
345/634
2010/0281432 A1* 11/2010 Geisner ................... G06F 3/011
715/849

FOREIGN PATENT DOCUMENTS

CN     102176197    9/2011
CN     102413886    4/2012

OTHER PUBLICATIONS

PCT/CN2013/087127; PCT Notification of Transmittal of the International Search Report and the Written Opinion of the International Searching Authority, or the Declaration. Mailed Mar. 27, 2014, 10 pages.

*Primary Examiner* — Shefali Goradia
(74) *Attorney, Agent, or Firm* — Blakely, Sokoloff, Taylor & Zafman LLP

(57) ABSTRACT

A mechanism is described for facilitating dynamic simulation of avatars based on user performances according to one embodiment. A method of embodiments, as described herein, includes capturing, in real-time, an image of a user, the image including a video image over a plurality of video frames. The method may further include tracking changes in size of the user image, the tracking of the changes may include locating one or more positions of the user image within each of the plurality of video frames, computing, in real-time, user performances based on the changes in the size of the user image over the plurality of video frames, and dynamically scaling an avatar associated with the user such that the avatar is dynamically simulated corresponding to the user performances.

25 Claims, 6 Drawing Sheets

(51) Int. Cl.
*G06T 7/00* (2006.01)
*G06T 7/20* (2006.01)
*G06T 1/00* (2006.01)
*G06T 3/40* (2006.01)
*G06F 3/01* (2006.01)

(52) U.S. Cl.
CPC ........ *G06K 9/00342* (2013.01); *G06T 1/0007* (2013.01); *G06T 3/40* (2013.01); *G06T 7/0022* (2013.01); *G06T 7/20* (2013.01); *G06T 2207/10016* (2013.01); *G06T 2207/30196* (2013.01)

MECHANISM FOR FACILITATING DYNAMIC SIMULATION OF AVATARS CORRESPONDING TO CHANGING USER PERFORMANCES AS DETECTED AT COMPUTING DEVICES

CROSS-REFERENCE TO RELATED APPLICATION

This patent application is a U.S. National Phase Application under 35 U.S.C. §371 of International Application No. PCT/CN2013/087127, filed Nov. 14, 2013, entitled MECHANISM FOR FACILITATING DYNAMIC SIMULATION OF AVATARS CORRESPONDING TO CHANGING USER PERFORMANCES AS DETECTED AT COMPUTING DEVICES by Wenlong Li, et al., the benefit and priority are claimed thereof and the entire contents of which are incorporated herein by reference.

FIELD

Embodiments described herein generally relate to computers. More particularly, embodiments relate to a mechanism for facilitating dynamic simulation of avatars corresponding to changing user performances as detected by computing devices.

BACKGROUND

Avatars are well-known and widely used in various systems and software applications, such as telecommunication applications, user interface applications, computer games, etc. An avatar may refer to an animated version of a human face, an animal face, a cartoon face, etc. Avatars are often used by users who wish to preserve their privacy by not revealing their real face.

Although a face avatar is supposed to represent the corresponding user's face, today's avatars are limited in that they do not correspondingly follow the changing expressions or gestures of the user's face. For example, camera-based face tracking can only track a limited number of facial features and are inadequate to drive avatar facial expression animations.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a technique for facilitating a facial-performance driven avatar on computing devices based on real-time (or super real-time) simulation of the user's performances, such as head movements, including zooming-in and/or zooming-out of the user's face relative to a computing device, facial expression changes, etc. Embodiments may provide a new and robust detecting/tracking algorithm along with a technique for calculating and extracting facial gestures and size/distance relevant to a computing device and accordingly, scaling and simulating the avatars. For example, in one embodiment, a technique is provided that can zoom-in/out a facial performance driven avatar on a computing devices, such as mobile computing device, without having the need for using depth sensors (e.g., it may be impractical to put a depth sensor on a mobile computing device) and instead, the technique may compute the zoom-in and zoom-out scale factor that may then be used to adjust the facial driven avatar size on the display screen associated with the computing device.

It is to be noted that although human face is used as an example throughout the document for the sake of brevity, clarity, and ease of understanding, embodiments are not limited in that manner and that the term user may refer to a single person, multiple persons, other living beings (e.g., dogs, cats, plants, etc.), and even non-living objects (e.g., statues, televisions, musical instruments, etc.). Further, for example, embodiments may be applied not only to the face of a single person, but that embodiments are equally applicable to and compatible with a group of persons, not merely limited to their faces, along with their pets and/or other objects, etc. Similarly, embodiments are not limited to a single computing device or a particular type of computing device, such as a smartphone, but that any number and type of devices may be used, such as computing devices with multiple or extend displays, small screens, big screens, and even massive screens, such as store displays, magic mirrors, having the ability to depth track any number and form of persons, pets, objects, etc., may be used.

Figure 1:
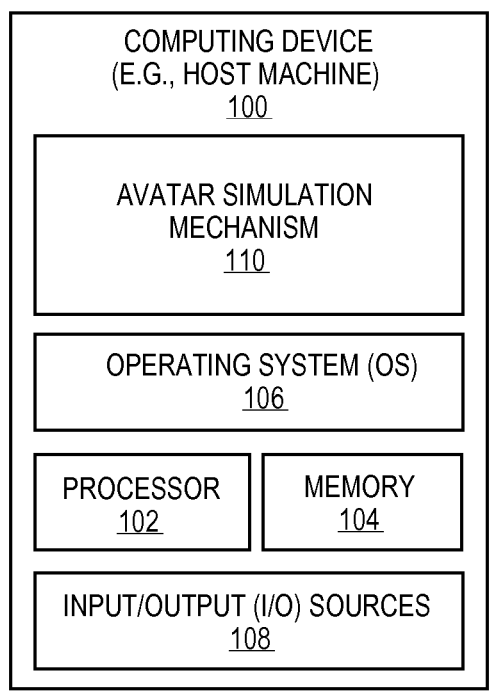
FIG. 1 illustrates an avatar simulation mechanism at a computing device according to one embodiment.

FIG. 1 illustrates an avatar simulation mechanism 110 at a computing device 100 according to one embodiment. Computing device 100 serves as a host machine for hosting avatar simulation mechanism ("avatar mechanism") 110 that includes a combination of any number and type of components for detecting changing expressions and movements of users (e.g., users' faces) and facilitating dynamic generation and movement of their corresponding avatars at computing devices, such as computing device 100. Computing device 100 may include large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", and "software package" may be used interchangeably throughout this document. Similarly, terms like "job", "input", "request" and "message" may be used interchangeably throughout this document.

Figure 2A:
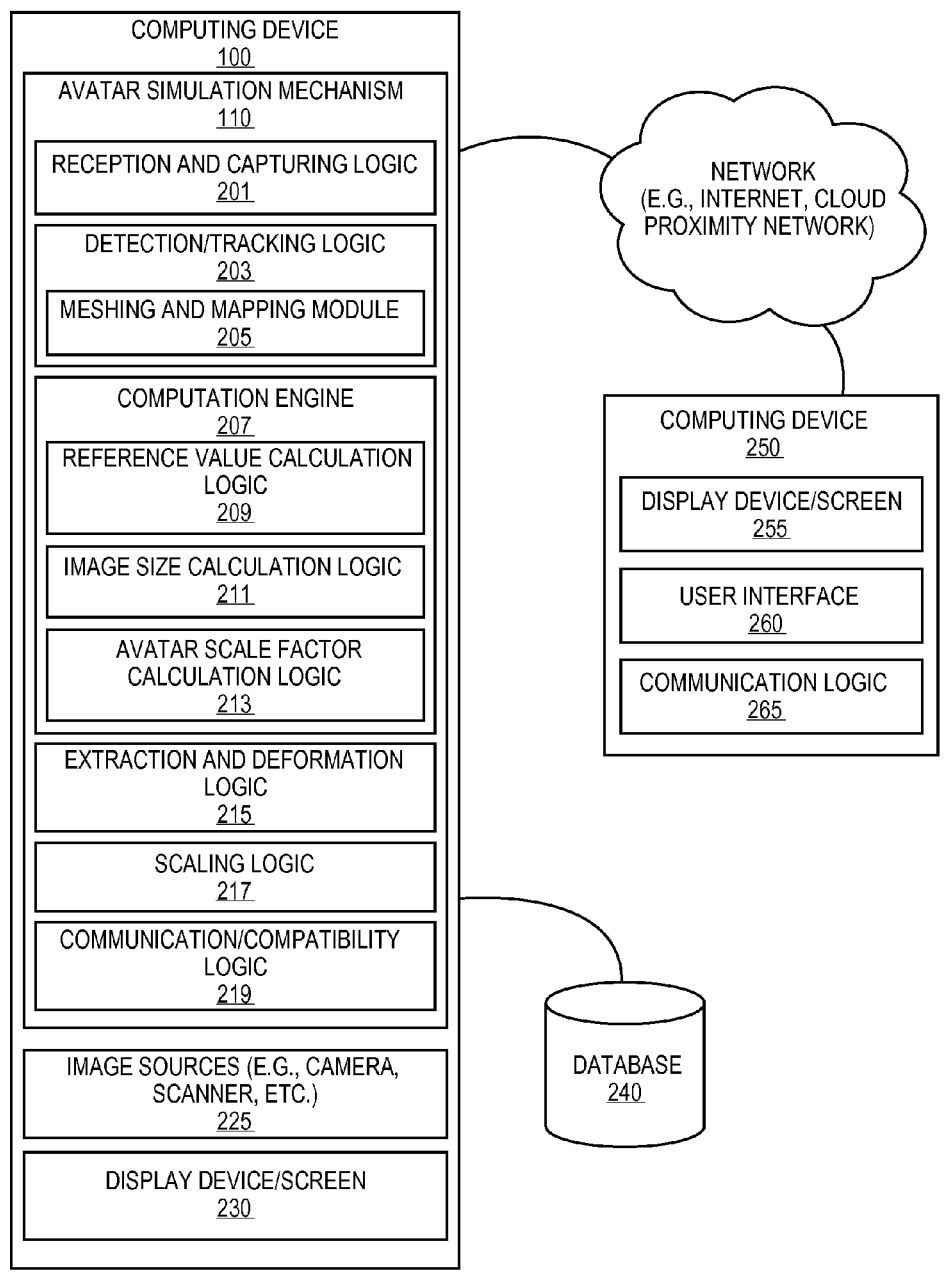
FIG. 2A illustrates an avatar simulation mechanism according to one embodiment.

FIG. 2A illustrates an avatar simulation mechanism 110 according to one embodiment. In one embodiment, avatar mechanism 110 may be employed at computing device 100, such as a laptop computer, a desktop computer, a smartphone, a tablet computer, etc. In one embodiment, avatar mechanism 110 may include any number and type of components, such as: reception and capturing logic 201; detection/tracking logic 203 including meshing and mapping module 205; computation engine 207 including reference value calculation logic 209, image size calculation logic 211, and avatar scale factor calculation logic 213; extraction and deformation logic 215; scaling logic 217; and communication/compatibility logic 219.

In one embodiment, reception and capturing logic 201 facilitates an image capturing device, such as camera 221, at computing device 100 to receive and capture an image associated with a user, such as a live and real-time image of the user's face being in front of camera 221 of computing device 100. As the live image of the user's face is received and captured, the user's face and its movements and expressions may be continuously, and in real-time, detected and tracked in live video frames by detection/tracking logic 203. The detecting and tracking of the user's face and its movements and expressions as performed by detection/tracking logic 203 may include detecting the user's face and determining various features of the face, such as positions of feature points, which may then be used to determine facial expression movements and head rigid movements. Further, based on these features, similar expression features may be accessed at and retrieved from a motion capture database, such as database 240. For more details, see U.S. patent application Ser. No. 13/977,682, filed Jun. 29, 2013, U.S. National Phase of PCT/CN2011/072603, filed Apr. 11, 2011, entitled *Avatar Facial Expression Techniques*, by Yangzhou Du, et al.

In some database, database 240 may be used to record, store, and maintain data relating to various human facial expressions, such a smile, frown, laugh, cry, anger, happy, surprise, speak, silent, eat, drink, sing, yawn sneeze, and the like. These expressions may be recorded as sequences of frames where each frame may include multiple features, such as the following nine features: 1) distance between upper and lower lips; 2) distance between two mouth corners; 3) distance between upper lip and nose tip; 4) distance between lower lip and nose tip; 5) distance between nose-wing and nose tip; 6) distance between upper and lower eyelids; 7) distance between eyebrow tip and nose-tip; 8) distance between two eyebrow tips; and 9) distance between eyebrow tip and eyebrow middle. Database 240 may include a data source, an information storage medium, such as memory (volatile or non-volatile), disk storage, optical storage, etc.

In one embodiment, based on the features retrieved from database 240, meshing and mapping module 205 employs a three-dimensional (3D) mesh to locate various facial points and maps them to the corresponding avatar. This may involve normalizing and remapping the human face to the avatar face, copying the facial expression changes to the avatar, and then driving the avatar to perform the same facial expression changes as in the retrieved features. In embodiments, meshing and mapping module 205 may include graphics rendering features that allow the avatar to be output by a display device 230 associated with computing device 100. For example, display screen or device 230 may visually output the avatar to the user and similarly, one or more display devices, such as display device 255, associated with one or more other computing devices, such as computing device 250, may display the same simulated avatar to their respective users. Further, display device 230 may be implemented with various display(s) including (but are not limited to) liquid crystal displays (LCDs), light emitting diode (LED) displays, plasma displays, and cathode ray tube (CRT) displays.

Computing device 250 may be in communication with computing device 100 over one or more networks, such as network 270 (e.g., cloud network, the Internet, intranet, cellular network, proximity or near proximity networks, etc.). Computing device 250 may further include user interface 260, communication logic 265, and one or more software applications including avatar mechanism 110.

In embodiments, detection/tracking logic 203 may receive image data from image source 225, where the image data may be in the form of a sequence of images or frames (e.g., video frames). Image sources 225 may include an image capturing device, such as a camera. Such a device may include various components, such as (but are not limited to) an optics assembly, an image sensor, an image/video encoder, etc., that may be implemented in any combination of hardware and/or software. The optics assembly may include one or more optical devices (e.g., lenses, mirrors, etc.) to project an image within a field of view onto multiple sensor elements within the image sensor. In addition, the optics assembly may include one or more mechanisms to control the arrangement of these optical device(s). For example, such mechanisms may control focusing operations, aperture settings, exposure settings, zooming operations, shutter speed, effective focal length, etc. Embodiments, however, are not limited to these examples.

In an avatar-based system (e.g., a video chatting system), it is important to capture a user's head gestures, as well as the user's facial expressions. In embodiments, these operations may be performed by detection/tracking logic 203. In turn, these gestures and expressions may be expressed as animation parameters, where such animation parameters are transferred to a graphics rendering engine. In this way, the avatar system may be able to reproduce the original user's facial expression on a virtual 3D model.

In some embodiments, a practical solution for detection/tracking logic 203 may provide various features. For instance, detection/tracking logic 203 may track rigid movement due to head gestures. Such rigid movement may include (but is not limited to) translation, rotation and scaling factors. Also, detection/tracking logic 203 may track non-rigid transformation due to facial expressions, where the non-rigid transformations may include multiple facial action units (e.g., six typical facial action units). Further, detection/tracking logic 203 may be optimized in its implementation to run in real-time on one or more processors (e.g., on Intel Atom 1.6 GHz processors).

Image sources 225 may further include one or more image sensors including an array of sensor elements where these elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples. For example, an image sensor converts light received through optics assembly into pixel values, where each of these pixel values represents a particular light intensity at the corresponding sensor element. Although these pixel values have been described as digital, they may alternatively be analog. As described above, the image sensing device may include an image/video encoder to encode and/or compress pixel values. Various techniques, standards, and/or formats (e.g., Moving Picture Experts Group (MPEG), Joint Photographic Expert Group (JPEG), etc.) may be employed for this encoding and/or compression.

As aforementioned, image sources 225 may any number and type of components, such as image capturing devices (e.g., one or more cameras, etc.) and image sensing devices, such as (but not limited to) context-aware sensors (e.g., temperature sensors, facial expression and feature measurement sensors working with one or more cameras, environment sensors (such as to sense background colors, lights, etc.), biometric sensors (such as to detect fingerprints, facial points or features, etc.), and the like. Computing device 100 may also include one or more software applications, such as business applications, social network websites (e.g., Facebook®, Google+®, Twitter®, etc.), business networking websites (e.g., LinkedIn®, etc.), communication applications (e.g., Skype®, Tango®, Viber®, etc.), games and other entertainment applications, etc., offering one or more user interfaces (e.g., web user interface (WUI), graphical user interface (GUI), touchscreen, etc.) to display the avatar and for the user to communicate with other users at other computing device 250, while ensuring compatibility with changing technologies, parameters, protocols, standards, etc.

Using detection/tracking logic 203, the avatar for the user's face is generated and its position in live video frames is located. This data is then provided to computation engine 207 where further calculations are performed, such as to derive the face size of the user in terms of face width and face height (e.g., face size=w*h, where w represents face width, and h represents face height). In one embodiment, reference value calculation logic 209 may be used to generate a reference value of a baseline or default avatar. For example, this referenced value may be provided by a system user (such as a system administrator, a computer programmer, etc.) or automatically and dynamically calculated, via reference value calculation logic 209, using research-based data retrieved from database 240, such as research performed over time may provide a typical distance between a user and a smartphone when the user is using a communication application as opposed to the distance between a user and a laptop computer or a desktop computer, etc. For example, such research-based on distance or zooming-in and zooming-out may then be used to determine the default (or typical or expected) size of a human face when, for example, the person is laughing as opposed to crying or simply leaning back, etc. This default face size may be referred to as reference value and represented as a combination of w and h, such as w*h being 60*60.

Further, in one embodiment, image size calculation logic 211 may dynamically determine the changing image or face size of the current user and calculate, in real-time, the changing image or face size value. In one embodiment, these image size values along with the reference value are then used by avatar scale factor calculation logic 213 to determine the exact location of the user's face with respect to computing device 100, such as whether and how much the user is zooming-in or zooming-out. Using avatar scale factor calculation logic 213, an image size value as calculated by image size calculation logic 211 is divided by the reference value as calculated by reference value calculation logic 209 to derive or compute an avatar scale factor. For example, if w*h of the image size value is 60*60, while the w*h of the reference value is also 60*60, then the avatar scale factor=face size value/reference value=1.0. If the face size value is reduced to 30*30, the avatar scale value is reduced to 0.5 representing the user's face is zooming-out or getting away from image sources 225 of computing device 100. On the contrary, if the face size value is increased to 120*120, the avatar scale value is increased to 2.0 representing the user's face is zooming-in or getting closer to image source 225 of computing device 100. It is contemplated that embodiments are not limited to a particular equation or formula and that, as aforementioned, the use of "human face" or "face size" in the above equation is merely used as an example for brevity and ease of understanding and that embodiments are not limited to it.

In one embodiment, extraction and deformation logic 215 may extract facial points by 3D mesh and deform avatar by the user's facial gesture. For more details, see U.S. patent application Ser. No. 13/977,682, filed Jun. 29, 2013, U.S. National Phase of PCT/CN2011/072603, filed Apr. 11, 2011, entitled *Avatar Facial Expression Techniques*, by Yangzhou Du, et al. For example, one or more image sources 225, including professional motion capture device(s) (such as products from Vicon™ Motion Systems, of Oxford, United Kingdom), may be used to capture human facial expressions, such as a human's face may be affixed (e.g., glued) with markers (e.g., 30-100 markers) while image source 225 may capture 3D coordinates of each marker in each frame when the human performs different expressions. These coordinates may then be recorded for various expressions; exemplary expressions include (but are not limited to) six types of basic expression (laugh, anger, surprise, sadness, fear, disgust), along with some of the aforementioned usual expressions, such as smile, frown, laugh, cry, happy, speak, silent, eat, drink, sing, yawn, sneeze, and the like. Each of these expressions may be repeated a few times which may result in a few minutes (e.g., about 10 minutes) of expression data being recorded at database 240.

Once the expression data has been recorded at database 240, extraction and deformation logic 215 may access and preprocess the database 240 by extraction of the facial features for each frame of the database; more particularly, for each frame in the database, extraction and deformation logic 215 may compute multiple facial features. The facial features refer to the aforementioned nine facial features, but it is contemplated that embodiments are not limited to these particular nine facial features.

In one embodiment, upon the extraction of the facial points by 3D mesh and the deformation of the avatar by the user's facial gesture, scaling logic 217 may be used to scale the animated avatar based on the previously obtained avatar scale factor or ration and display the scaled avatar via display device 230 and one or more of display devices 255. For example, if the avatar scale factor relating to the user's face is 0.5 (e.g., 30*30/60*60), then the animated avatar corresponding to the user's face is correspondingly adjusted (such as zooming-out or making the avatar half the size) according to the same scale (e.g., glScale(0.5, 0.5, 0.5), representing x-axis, y-axis, and z-axis, respectively) being represented by one or more equations or formulae, such as glScalef(GLfloat x, GLfloat y, GLfloat z; where x, y, and z are x-axis, y-axis, and z-axis, respectively) or glTranslatef (GLfloat x, GLfloat y, GLfloat z), etc. Similarly, for example, if the user's face is 2.0 (e.g., 120*120/60*60), then the animated avatar corresponding to the user's face is correspondingly adjusted (such as zooming-in or making the avatar twice as large) according to the same scale (e.g., 2.0, 2.0, 2.0, representing x-axis, y-axis, and z-axis, respectively). It is contemplated that in this example, 60*60 represents the w*h of default reference value, while 30*30 and 120*120 represent the w*h of the computed user face size values representing zooming-out and zooming-in, respectively, of the user's face with respect to image sources 225 of computing device 100.

Communication/compatibility logic 219 may be used to facilitate dynamic communication and compatibility between various computing devices, such as computing device 100 and computing devices 250 (such as a mobile computing device, a desktop computer, a server computing device, etc.), storage devices, databases and/or data sources, such as database 240, networks, such as network 270 (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), connectivity and location management techniques, software applications/websites, (e.g., social and/or business networking websites, such as Facebook®, LinkedIn®, Google+®, Twitter®, etc., business applications, games and other entertainment applications, etc.), programming languages, etc., while ensuring compatibility with changing technologies, parameters, protocols, standards, etc.

It is contemplated that any number and type of components 201-219 of avatar mechanism 110 may not necessarily be at a single computing device and may be allocated among or distributed between any number and type of computing devices, including computing devices 100, 250 having (but are not limited to) server computing devices, cameras, PDAs, mobile phones (e.g., smartphones, tablet computers, etc.), personal computing devices (e.g., desktop devices, laptop computers, etc.), smart televisions, servers, wearable devices, media players, any smart computing devices, and so forth. Further examples include microprocessors, graphics processors or engines, microcontrollers, application specific integrated circuits (ASICs), and so forth. Embodiments, however, are not limited to these examples.

Communication logic 265 of computing devices 250 may be similar to or the same as communication/compatibility logic 219 of computing device 100 and may be used to facilitate communication between avatar mechanism 110 at computing device 100 and one or more software applications at computing devices 250 for communication of avatars over one or more networks, such as network 270. Further, logic 265, 219 may be arranged or configured to use any one or more communication technologies, such as wireless or wired communications and relevant protocols (e.g., Wi-Fi®, WiMAX, Ethernet, etc.), to facilitate communication over one or more networks, such as network 270 (e.g., Internet, intranet, cloud network, proximity network (e.g., Bluetooth, etc.). Database 240 may include any number and type of devices or mediums (such as data storage devices, hard drives, solid-state drives, hard disks, memory cards or devices, memory circuits, etc.) for short-time and/or long-term storage of data (e.g., patient information, customization parameters, process protocols, etc.), policies, resources, software programs or instructions, etc. Each of computing device 250 may also include a memory and/or storage medium for storing, maintaining, and/or caching of data, including avatars and other relevant information, such as facial feature points, etc.

Although one or more examples (e.g., a single human face, mobile computing device, etc.) may be discussed throughout this document for brevity, clarity, and ease of understanding, it is contemplated that embodiments are not limited to any particular number and type of users, avatars, forms of access to resources or computing devices, users, network or authentication protocols or processes, or the like. For example, embodiments are not limited to any particular network security infrastructures or protocols (e.g., single-sign-on (SSO) infrastructures and protocols) and may be compatible with any number and type of network security infrastructures and protocols, such as security assertion markup language (SAML), OAuth, Kerberos, etc.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, such as "avatar", "avatar scale factor", "scaling", "animation", "human face", "facial feature points", "zooming-in", "zooming-out", etc., should not be read to limit embodiments to software or devices that carry that label in products or in literature external to this document.

It is contemplated that any number and type of components may be added to and/or removed from avatar simulation mechanism 110 to facilitate various embodiments including adding, removing, and/or enhancing certain features. For brevity, clarity, and ease of understanding of avatar simulation mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
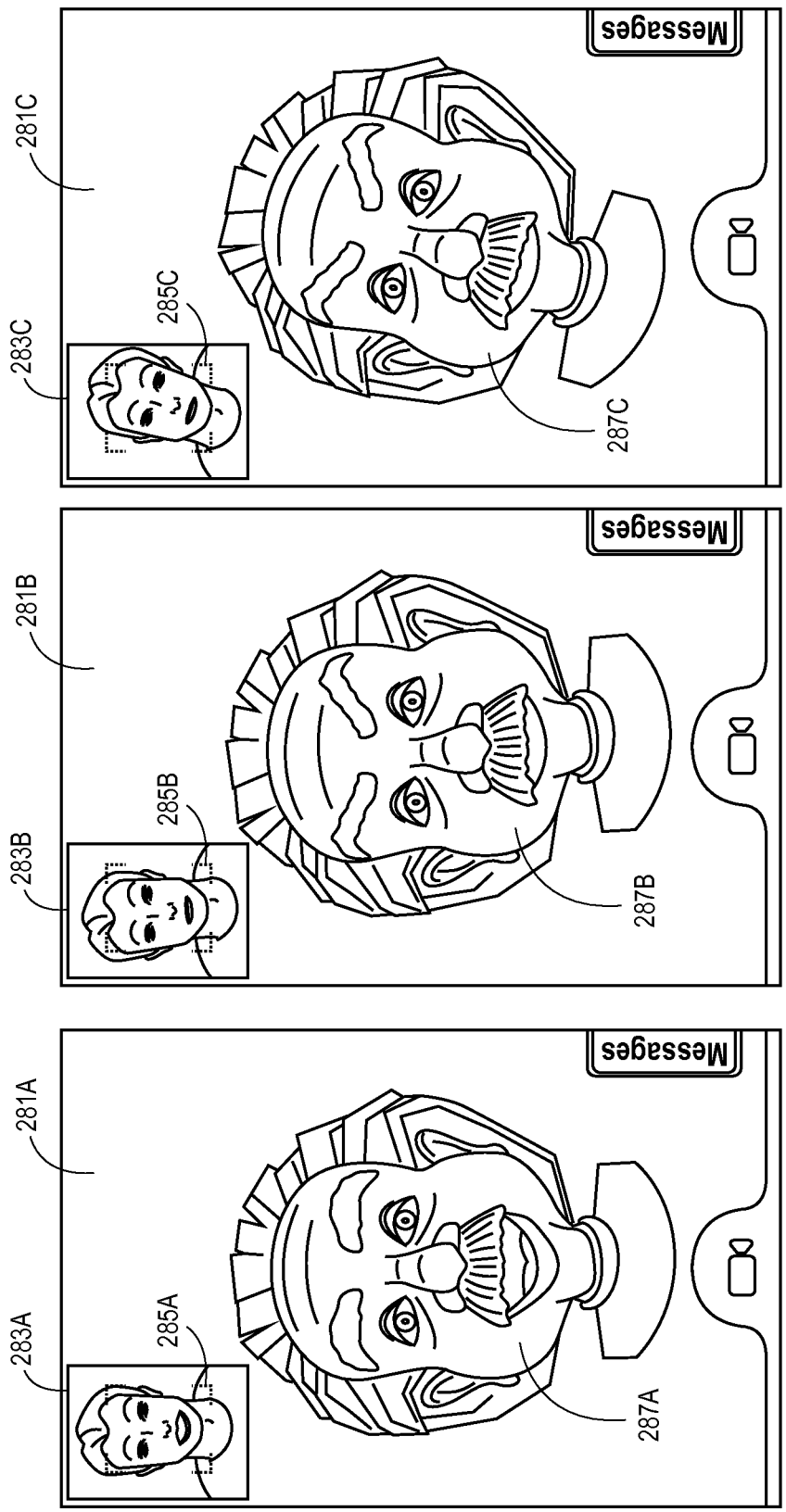
FIG. 2B illustrates snapshots of an avatar being driven by a user's facial performance according to one embodiment.

FIG. 2B illustrates snapshots 281A-281C of an avatar 287A-287C being driven by a user's facial performance according to one embodiment. As illustrated and in one embodiment, top left windows 283A-283C holds the image of the user's face and shows a live video frame, where the detected face is marked by inserts 285A-285C. In the left snapshot 281A, the user appears to be talking (e.g., open mouth) and having marked this expression via insert 285A, it is correspondingly reflected in the corresponding avatar 287A and similarly, in the middle snapshot 281B, the user appears to be silent and listening with a particular with his eyebrows raised and having marked this expression via insert 285B, this is correspondingly reflected in the corresponding avatar 287B. Finally, in the right snapshot 281C, the user's head appears to be tilted to the user's left and again, having marked this expression via insert 285C, this is correspondingly reflected in the corresponding avatar 287C.

Figure 2C:
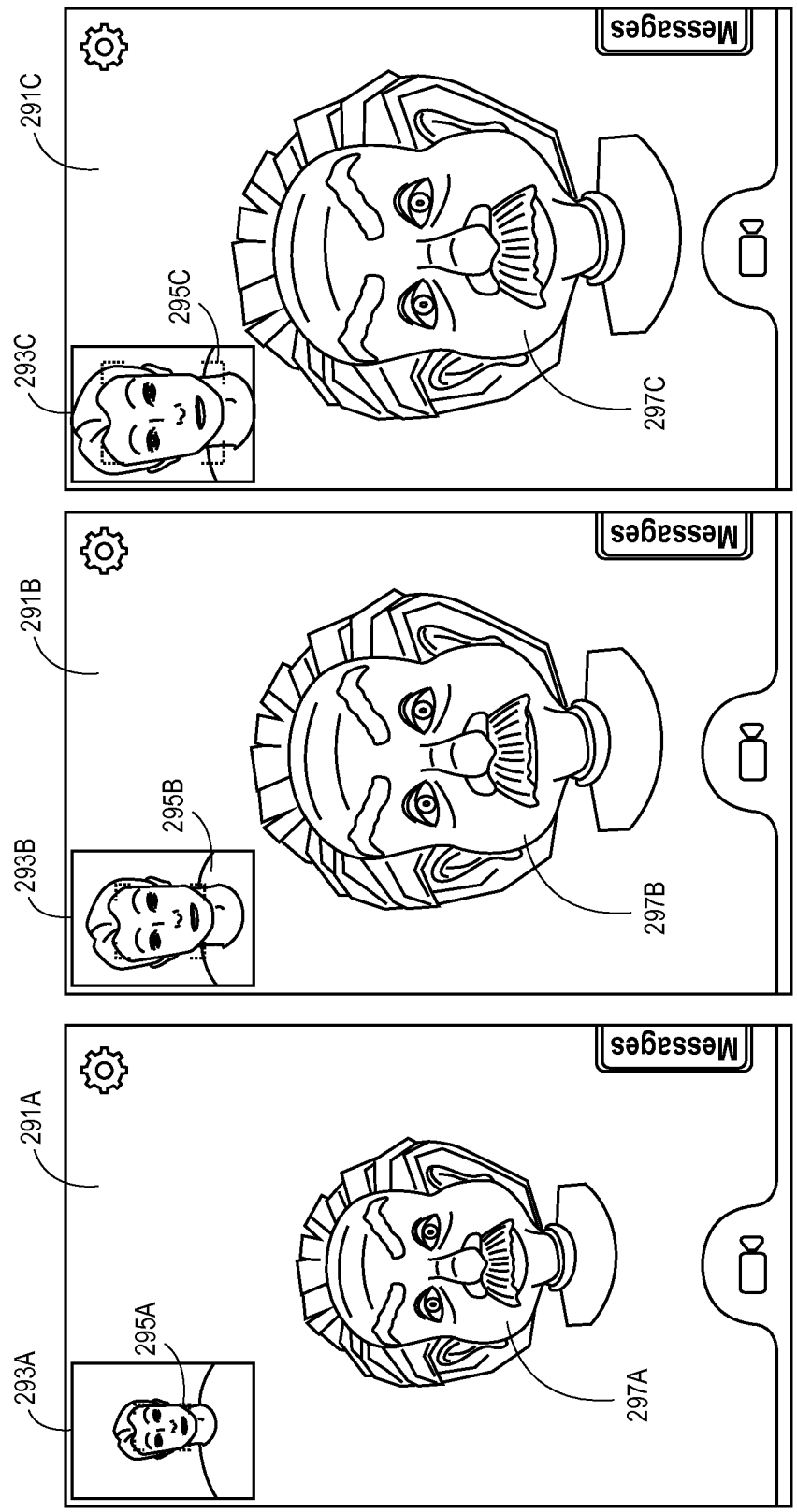
FIG. 2C illustrates snapshots of an avatar being driven by a user's facial performance according to one embodiment.

FIG. 2C illustrates snapshots 291A-291C of an avatar 297A-297C being driven by a user's facial performance according to one embodiment. In the illustrated embodiment, snapshots 291A-291C provide varying face input sizes, such zoomed-in images or zoomed-out images, as shown in top left windows 293A-293C and being portrayed via the corresponding avatars 297A-297C. In the left snapshot 291A, the user appears to be zoomed-out (or farthest from the computing device) and having marked the user's face size in insert 295A, the corresponding avatar 297A is shown to be away from the viewing user. Similarly, in the middle snapshot 291B, the user appears to be zoomed-in (or closer to the computing device) relative to the user position in snapshot 291A, and having marked the user's face size in insert 295B, the corresponding avatar 297B is shown to be closer to the viewing user. Finally, in the right snapshot 291C, the user appears to be further zoomed-in (or closest to the computing device) relative to the user positions in snapshots 291A, 291B, and having marked the user's face size in insert 295C, the corresponding avatar 297C is shown to be the closest to the viewing user.

Figure 3:
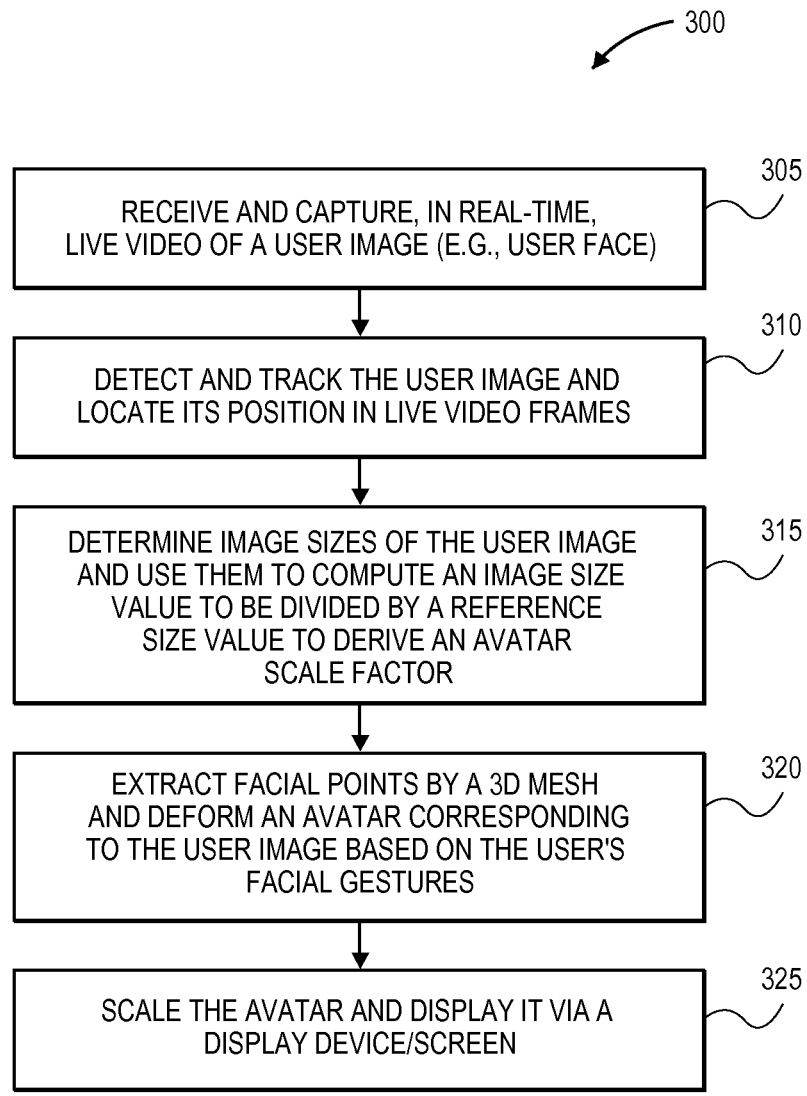
FIG. 3 illustrates a method for facilitating user performance-based simulation and presentation of a corresponding avatar at a computing device according to one embodiment.

FIG. 3 illustrates a method 300 for facilitating user performance-based simulation and presentation of a corresponding avatar at a computing device according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by avatar simulation mechanism 110 FIG. 1. The processes of method 300 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1, 2A-2C are not discussed or repeated here.

Method 300 begins at block 305 with receiving and capturing of a live, real-time, video image of a user (e.g., user's face) via one or more image sources, such as a camera, at a computing device. At block 310, the user's image, such as the user's face, is detected and tracked while its position with respect to the computing device (such as getting closer or moving away, etc.) is located in live, real-time, video frame. At block 315, in one embodiment, image sizes, such as face sizes of the user's face, are determined and computed into an image size value, such as face size value, which is then divided by a pre-determined or pre-calculated reference value to derive or obtain an avatar scale factor. At block 320, facial points are extracted by a 3D mesh and the corresponding avatar is deformed by using the data relating to the user's facial gestures. At block 325, the animated avatar corresponding to the user's image, such as the user's face, is scaled using the derived avatar scale factor and then displayed using a display screen of the computing device.

Figure 4:
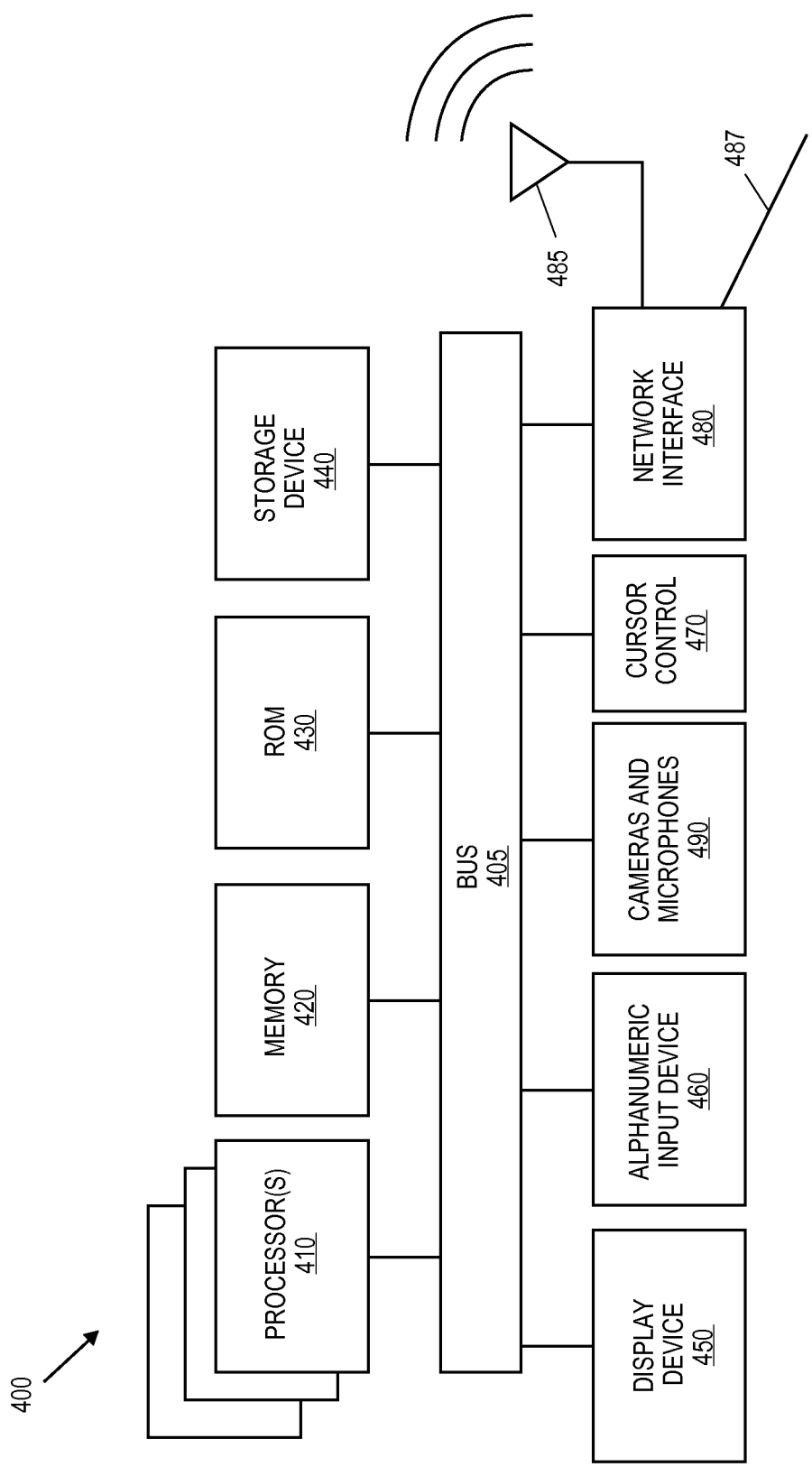
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100 of FIG. 1 and/or one or more computing device 250 of FIG. 2A.

Computing system 400 includes bus 405 (or, for example, a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate dynamic simulation of avatars based on user performances, comprising: reception and capturing logic to capture, in real-time, an image of a user, wherein the image includes a video image over a plurality of video frames; detection/tracking logic to track changes in size of the user image, wherein tracking the changes includes locating one or more positions of the user image within each of the plurality of video frames; computation engine to compute, in real-time, user performances based on the changes in the size of the user image over the plurality of video frames; and scaling logic to dynamically scale an avatar associated with the user such that the avatar is dynamically simulated corresponding to the user performances.

Example 2 includes the subject matter of Example 1, wherein the reception and capturing logic is further to facilitate an image source to receive and capture the user image, wherein the image source includes a camera or a scanner.

Example 3 includes the subject matter of Example 1 or 2, wherein locating the one or more positions comprises measuring one or more distances between the user and the image source of the apparatus, wherein the one or more distances represent zooming-in or zooming-out of the user with respect to the image source.

Example 4 includes the subject matter of Example 1, wherein the computation engine comprises reference value calculation logic to calculate, in real time and based on pre-determined criteria, a reference value representing a default value.

Example 5 includes the subject matter of Example 1 or 4, wherein the computation engine further comprises image size calculation logic to calculate, in real-time, an image size value based on the changes in the size of the user image, Example 6 includes the subject matter of Example 5, wherein the computation engine further comprises avatar scale factor calculation logic to calculate, in real-time, an avatar factor based on the image size value by the reference value, wherein the image size value is divided by the reference value.

Example 7 includes the subject matter of Example 1 or 6, user performances are dynamically computed based on the avatar scale factor, wherein the user performances comprise zooming-in of the user or zooming-out of the user with respect to the image source of the apparatus, the user performances further comprising one or more human expressions including one or more of laugh, anger, surprise, sad, fear, disgust, smile, frown, cry, happy, speak, silent, eat, drink, sing, yawn, and sneeze.

Example 8 includes the subject matter of Example 11, further comprising a display device to display the scaled avatar that is simulated according to the user performances.

Example 9 includes the subject matter of Example 1, further comprising extraction and deformation logic to extract a plurality of points on the user image by facilitating, via mashing and mapping module, a three-dimensional mesh of the user image.

Example 10 includes the subject matter of Example 9, wherein the extraction and deformation logic is further to deform the avatar based on the user's gestures as determined from the plurality of points on the user image, wherein the user image includes an image of the user's face, and the plurality of points include a plurality of facial points on the user's face.

Example 11 includes a method for facilitating dynamic simulation of avatars based on user performances, comprising: capturing, in real-time, an image of a user, wherein the image includes a video image over a plurality of video frames; tracking changes in size of the user image, wherein tracking the changes includes locating one or more positions of the user image within each of the plurality of video frames; computing, in real-time, user performances based on the changes in the size of the user image over the plurality of video frames; and dynamically scaling an avatar associated with the user such that the avatar is dynamically simulated corresponding to the user performances.

Example 12 includes the subject matter of Example 11, wherein capturing further comprises facilitate an image source to receive and capture the user image, wherein the image source includes a camera or a scanner.

Example 13 includes the subject matter of Example 11, wherein locating the one or more positions comprises measuring one or more distances between the user and the image source of the apparatus, wherein the one or more distances represent zooming-in or zooming-out of the user with respect to the image source.

Example 14 includes the subject matter of Example 11, wherein computing further comprises calculating, in real-time and based on pre-determined criteria, a reference value representing a default value.

Example 15 includes the subject matter of Example 14, wherein computing further comprises calculating, in real-time, an image size value based on the changes in the size of the user image, Example 16 includes the subject matter of Example 15, wherein computing further comprises calculating, in real-time, an avatar factor based on the image size value by the reference value, wherein the image size value is divided by the reference value.

Example 17 includes the subject matter of Example 11, user performances are dynamically computed based on the avatar scale factor, wherein the user performances comprise zooming-in of the user or zooming-out of the user with respect to the image source of the apparatus, the user performances further comprising one or more human expressions including one or more of laugh, anger, surprise, sad, fear, disgust, smile, frown, cry, happy, speak, silent, eat, drink, sing, yawn, and sneeze.

Example 18 includes the subject matter of Example 11, further comprising displaying, via a display device, the scaled avatar that is simulated according to the user performances.

Example 19 includes the subject matter of Example 11, further comprising extracting a plurality of points on the user image by facilitating a three-dimensional mesh of the user image.

Example 20 includes the subject matter of Example 19, further comprising deforming the avatar based on the user's gestures as determined from the plurality of points on the user image, wherein the user image includes an image of the user's face, and the plurality of points include a plurality of facial points on the user's face.

Example 21 includes at least one machine-readable medium comprising a plurality of instructions that in response to being executed on a computing device, causes the computing device to carry out operations according to any one of the aforementioned examples 11 to 20.

Example 22 includes at least one non-transitory or tangible machine-readable medium comprising a plurality of instructions that in response to being executed on a computing device, causes the computing device to carry out operations according to any one of the aforementioned examples 11 to 20.

Example 23 includes a system comprising a mechanism to carry out operations according to any one of the aforementioned examples 11 to 20.

Example 24 includes an apparatus comprising means to carry out operations according to any one of the aforementioned examples 11 to 20.

Example 25 includes a computing device arranged to carry out operations according to any one of the aforementioned examples 11 to 20.

Example 26 includes a communications device arranged to carry out operations according to any one of the aforementioned examples 11 to 20.

Example 27 includes a system comprising a storage device having instructions, and a processor to execute the instructions to facilitate a mechanism to perform one or more operations comprising: capturing, in real-time, an image of a user, wherein the image includes a video image over a plurality of video frames; tracking changes in size of the user image, wherein tracking the changes includes locating one or more positions of the user image within each of the plurality of video frames; computing, in real-time, user performances based on the changes in the size of the user image over the plurality of video frames; and dynamically scaling an avatar associated with the user such that the avatar is dynamically simulated corresponding to the user performances.

Example 28 includes the subject matter of Example 27, wherein capturing further comprises facilitate an image source to receive and capture the user image, wherein the image source includes a camera or a scanner.

Example 29 includes the subject matter of Example 27, wherein locating the one or more positions comprises measuring one or more distances between the user and the image source of the apparatus, wherein the one or more distances represent zooming-in or zooming-out of the user with respect to the image source.

Example 30 includes the subject matter of Example 27, wherein computing further comprises calculating, in real-time and based on pre-determined criteria, a reference value representing a default value.

Example 31 includes the subject matter of Example 30, wherein computing further comprises calculating, in real-time, an image size value based on the changes in the size of the user image.

Example 32 includes the subject matter of Example 31, wherein computing further comprises calculating, in real-time, an avatar factor based on the image size value by the reference value, wherein the image size value is divided by the reference value.

Example 33 includes the subject matter of Example 27, wherein the user performances are dynamically computed based on the avatar scale factor, wherein the user performances comprise zooming-in of the user or zooming-out of the user with respect to the image source of the apparatus, the user performances further comprising one or more human expressions including one or more of laugh, anger, surprise, sad, fear, disgust, smile, frown, cry, happy, speak, silent, eat, drink, sing, yawn, and sneeze.

Example 34 includes the subject matter of Example 27, wherein the one or more operations further comprise displaying, via a display device, the scaled avatar that is simulated according to the user performances.

Example 35 includes the subject matter of Example 27, wherein the one or more operations further comprise extracting a plurality of points on the user image by facilitating a three-dimensional mesh of the user image.

Example 36 includes the subject matter of Example 35, wherein the one or more operations further comprise deforming the avatar based on the user's gestures as determined from the plurality of points on the user image, wherein the user image includes an image of the user's face, and the plurality of points include a plurality of facial points on the user's face.

Example 37 includes an apparatus comprising: means for capturing, in real-time, an image of a user, wherein the image includes a video image over a plurality of video frames; means for tracking changes in size of the user image, wherein means for tracking the changes includes means for locating one or more positions of the user image within each of the plurality of video frames; means for computing, in real-time, user performances based on the changes in the size of the user image over the plurality of video frames; and means for dynamically scaling an avatar associated with the user such that the avatar is dynamically simulated corresponding to the user performances.

Example 38 includes the subject matter of Example 37, wherein means for capturing further comprises means for facilitate an image source to receive and capture the user image, wherein the image source includes a camera or a scanner.

Example 39 includes the subject matter of Example 37, wherein means for locating the one or more positions comprises means for measuring one or more distances between the user and the image source of the apparatus, wherein the one or more distances represent zooming-in or zooming-out of the user with respect to the image source.

Example 40 includes the subject matter of Example 37, wherein means for computing further comprises means for calculating, in real-time and based on pre-determined criteria, a reference value representing a default value.

Example 41 includes the subject matter of Example 40, wherein means for computing further comprises means for calculating, in real-time, an image size value based on the changes in the size of the user image.

Example 42 includes the subject matter of Example 41, wherein means for computing further comprises means for calculating, in real-time, an avatar factor based on the image size value by the reference value, wherein the image size value is divided by the reference value.

Example 43 includes the subject matter of Example 37, wherein the user performances are dynamically computed based on the avatar scale factor, wherein the user performances comprise zooming-in of the user or zooming-out of the user with respect to the image source of the apparatus, the user performances further comprising one or more human expressions including one or more of laugh, anger, surprise, sad, fear, disgust, smile, frown, cry, happy, speak, silent, eat, drink, sing, yawn, and sneeze.

Example 44 includes the subject matter of Example 37, further comprising means for displaying, via a display device, the scaled avatar that is simulated according to the user performances.

Example 45 includes the subject matter of Example 37, further comprising means for extracting a plurality of points on the user image by facilitating a three-dimensional mesh of the user image.

Example 46 includes the subject matter of Example 45, further comprising means for deforming the avatar based on the user's gestures as determined from the plurality of points on the user image, wherein the user image includes an image of the user's face, and the plurality of points include a plurality of facial points on the user's face.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
    reception and capturing logic to capture, in real-time, a live image of a user, wherein the live image includes a live video image over a plurality of video frames, wherein the live image is being communicated, in real-time, for facilitating live viewing of a live avatar corresponding to the live image using one or more display screens of the apparatus or one of more computing devices;
    detection/tracking logic to track changes in size of the live image, wherein tracking the changes includes locating one or more positions of the live image within each of the plurality of video frames;
    computation engine to compute, in real-time, user performances based on the changes in the size of the live image over the plurality of video frames, wherein the use performances are further computed based on the user's gestures including facial expressions as interpreted from tracking of a plurality of facial point on the user's face; and scaling logic to dynamically scale the live avatar associated with the user and corresponding to the live image such that the live avatar is dynamically simulated corresponding to the user performances.

2. The apparatus of claim 1, wherein the reception and capturing logic is further to facilitate an image source to receive and capture the live image, wherein the image source includes a camera or a scanner.

3. The apparatus of claim 1, wherein locating the one or more positions comprises measuring one or more distances between the user and the image source of the apparatus, wherein the one or more distances represent zooming-in or zooming-out of the user with respect to the image source.

4. The apparatus of claim 1, wherein the computation engine comprises reference value calculation logic to calculate, in real time and based on pre-determined criteria, a reference value representing a default value.

5. The apparatus of claim 4, wherein the computation engine further comprises image size calculation logic to calculate, in real-time, an image size value based on the changes in the size of the live image.

6. The apparatus of claim 5, wherein the computation engine further comprises avatar scale factor calculation logic to calculate, in real-time, an avatar factor based on the image size value by the reference value, wherein the image size value is divided by the reference value.

7. The apparatus of claim 1, wherein the user performances are dynamically computed based on the avatar scale factor, wherein the user performances comprise zooming-in of the user or zooming-out of the user with respect to the image source of the apparatus, the user performances further comprising one or more human expressions including one or more of laugh, anger, surprise, sad, fear, disgust, smile, frown, cry, happy, speak, silent, eat, drink, sing, yawn, and sneeze.

8. The apparatus of claim 1, further comprising a display device to display the scaled live avatar that is simulated according to the user performances.

9. The apparatus of claim 1, further comprising extraction and deformation logic to extract a plurality of points on the live image by facilitating, via mashing and mapping module, a three-dimensional mesh of the live image.

10. The apparatus of claim 9, wherein the extraction and deformation logic is further to deform the live avatar based on the user's gestures as determined from the plurality of points on the live image, wherein the live image includes an image of the user's face, and the plurality of points include the plurality of facial points on the user's face.

11. A method comprising:
capturing, in real-time, a live image of a user, wherein the live image includes a live video image over a plurality of video frames, wherein the live image is being communicated, in real time, for facilitating live viewing of a live avatar corresponding to the live image using one of more display screens of a computing device or one of more other computing devices;

tracking changes in size of the live image, wherein tracking the changes includes locating one or more positions of the live image within each of the plurality of video frames;

computing, in real-time, user performances based on the changes in the size of the live image over the plurality of video frames, wherein the user performances are further computer based on the user's gestures including facial expressions as interpreted from tracking of plurality of facial points on the user's face; and dynamically scaling the live avatar associated with the user and corresponding to the live image such that the live avatar is dynamically simulated corresponding to the user performances.

12. The method of claim 11, wherein capturing further comprises facilitating an image source to receive and capture the live image; wherein the image source includes a camera or a scanner.

13. The method of claim 11, wherein locating the one or more positions comprises measuring one or more distances between the user and the image source of the computing device, wherein the one or more distances represent zooming-in or zooming-out of the user with respect to the image source.

14. The method of claim 11, wherein computing further comprises calculating, in real-time and based on pre-determined criteria, a reference value representing a default value.

15. The method of claim 14, wherein computing further comprises calculating, in real-time, an image size value based on the changes in the size of the live image.

16. The method of claim 15, wherein computing further comprises calculating, in real-time, an avatar factor based on the image size value by the reference value, wherein the image size value is divided by the reference value.

17. The method of claim 11, wherein the user performances are dynamically computed based on the avatar scale factor, wherein the user performances comprise zooming-in of the user or zooming-out of the user with respect to the image source of the computing device, the user performances further comprising one or more human expressions including one or more of laugh, anger, surprise, sad, fear, disgust, smile, frown, cry, happy, speak, silent, eat, drink, sing, yawn, and sneeze.

18. The method of claim 11, further comprising displaying, via a display device, the scaled live avatar that is simulated according to the user performances.

19. The method of claim 11, further comprising extracting a plurality of points on the live image by facilitating a three-dimensional mesh of the live image.

20. The method of claim 19, further comprising deforming the live avatar based on the user's gestures as determined from the plurality of points on the live image, wherein the live image includes an image of the user's face, and the plurality of points include a plurality of facial points on the user's face.

21. At least one non-transitory machine-readable medium comprising a plurality of instructions that in response to being executed on a computing device, causes the computing device to:

capture, in real-time, a live image of a user, wherein the live image includes a live video image over a plurality of video frames, wherein the live image is being communicated, in real time, for facilitating live viewing of a live avatar corresponding to the live image using one or more display screens of the computing device or one of more other computing devices;

track changes in size of the live image, wherein tracking the changes includes locating one or more positions of the live image within each of the plurality of video frames;

compute, in real-time, user performances based on the changes in the size of the live image over the plurality of video frames, wherein the user performances are further computer based on the user's gestures including facial expressions as interpreted from tracking a plurality of facial points on the user's face; and dynamically scale the live avatar associated with the user and corresponding to the live image such that the live avatar is dynamically simulated corresponding to the user performances.

22. The non-transitory machine-readable medium of claim 21, wherein the computing device is further to facilitate an image source to receive and capture the live image, wherein the image source includes a camera or a scanner, and wherein locating the one or more positions comprises measuring one or more distances between the user and the image source of the computing device, wherein the one or more distances represent zooming-in or zooming-out of the user with respect to the image source.

23. The non-transitory machine-readable medium of claim 21, wherein the computing device is further to calculate, in real-time and based on pre-determined criteria, a reference value representing a default value, wherein computing further comprises calculating, in real-time, an image size value based on the changes in the size of the live image, and wherein computing further comprises calculating, in real-time, an avatar factor based on the image size value by the reference value, wherein the image size value is divided by the reference value.

24. The non-transitory machine-readable medium of claim 21, wherein the user performances are dynamically computed based on the avatar scale factor, wherein the user performances comprise zooming-in of the user or zooming-out of the user with respect to the image source of the computing device, the user performances further comprising one or more human expressions including one or more of laugh, anger, surprise, sad, fear, disgust, smile, frown, cry, happy, speak, silent, eat, drink, sing, yawn, and sneeze.

25. The machine-readable medium of claim 21, wherein the computing device is further to:

extract a plurality of points on the live image by facilitating a three-dimensional mesh of the live image; and deform the live avatar based on the user's gestures as determined from the plurality of points on the live image, wherein the live image includes an image of the user's face, and the plurality of points include a plurality of facial points on the user's face, wherein the scaled live avatar being simulated according to the user performances is displayed via a display device.

* * * * *

UNITED STATES PATENT AND TRADEMARK OFFICE
CERTIFICATE OF CORRECTION

PATENT NO. : 9,489,760 B2  
APPLICATION NO. : 14/358394  
DATED : November 8, 2016  
INVENTOR(S) : Li et al.

Page 1 of 1

It is certified that error appears in the above-identified patent and that said Letters Patent is hereby corrected as shown below:

In the Claims

In Column 16, at Line 67, delete "use" and insert --user--.

In Column 17, at Line 2, delete "point" and insert --points--.

In Column 17, at Line 67, delete "computer" and insert --computed--.

In Column 18, at Line 67, delete "computer" and insert --computed--.

Signed and Sealed this  
Twenty-eighth Day of February, 2017

Michelle K. Lee  
*Director of the United States Patent and Trademark Office*